United States Patent [19]

Senatore et al.

[11] Patent Number: 4,786,711

[45] Date of Patent: Nov. 22, 1988

[54] P-PHENYLENE SULFIDE POLYMER PREPARATION WITH DEHYDRATED MIXTURE OF ALKALI METAL HYDROXIDE AND EXCESS ALKALI METAL BISULFIDE

[75] Inventors: Guy Senatore; Afif M. Nesheiwat, both of Bartlesville, Okla.

[73] Assignee: Phillips Petroleum Company, Bartlesville, Okla.

[21] Appl. No.: 6,409

[22] Filed: Jan. 23, 1987

[51] Int. Cl.$^4$ .............................................. C08G 75/16
[52] U.S. Cl. ..................................................... 528/388
[58] Field of Search ........................................ 528/388

[56] References Cited

U.S. PATENT DOCUMENTS

| | | | |
|---|---|---|---|
| 3,354,129 | 11/1967 | Edmonds, Jr. et al. | 260/79 |
| 3,786,035 | 1/1974 | Scoggin | 260/79.1 |
| 3,867,356 | 2/1975 | Campbell | 260/79.1 |
| 3,870,686 | 3/1975 | Campbell | 260/79.1 |
| 3,919,177 | 11/1975 | Campbell | 260/79.1 |
| 4,025,496 | 5/1977 | Anderson et al. | 260/79.1 |
| 4,350,810 | 9/1982 | Tiessen et al. | 528/388 |
| 4,373,091 | 2/1983 | Edmonds, Jr. | 528/481 |
| 4,415,729 | 11/1983 | Scoggins et al. | 528/388 |
| 4,461,860 | 7/1984 | Vives | 524/80 |
| 4,595,748 | 6/1986 | Ostlinning et al. | 528/388 |
| 4,598,144 | 7/1986 | Ostlinning et al. | 528/388 |
| 4,663,430 | 5/1987 | Ostlinning et al. | 528/388 |

FOREIGN PATENT DOCUMENTS

| | | |
|---|---|---|
| 0073525 | 3/1983 | European Pat. Off. . |
| 0096384 | 12/1983 | European Pat. Off. . |
| 0104560 | 4/1984 | European Pat. Off. . |

*Primary Examiner*—Harold D. Anderson
*Attorney, Agent, or Firm*—J. D. Brown

[57] ABSTRACT

Poly(p-phenylene sulfide) is prepared by the reaction of a p-dihalobenzene such as p-dichlorobenzene, with a dehydrated admixture of an alkali metal hydroxide such as sodium hydroxide, and an alkali metal bisulfide such as sodium bisulfide, in a polar organic solvent such as N-methyl-2-pyrollidone (NMP), employing a molar ratio of alkali metal hydroxide to alkali metal bisulfide of about 0.80:1 to 0.98:1. Poly(p-phenylene sulfide) having a high extrusion rate such as about 100 to about 1000 grams/10 minutes can be prepared in this manner.

10 Claims, No Drawings

P-PHENYLENE SULFIDE POLYMER PREPARATION WITH DEHYDRATED MIXTURE OF ALKALI METAL HYDROXIDE AND EXCESS ALKALI METAL BISULFIDE

FIELD OF THE INVENTION

This invention relates to processes for the production of polymers from aromatic compounds. In one aspect, this invention relates to processes for the production of p-phenylene sulfide polymers. In another aspect, this invention relates to processes for the production of poly(p-phenylene sulfide) having a high extrusion rate. In still another aspect, this invention relates to the recovery of poly(p-phenylene sulfide) having a high extrusion rate from its reaction mixture.

BACKGROUND OF THE INVENTION

A basic process for the production of arylene sulfide polymers from polyhalo-substituted aromatic compounds by reaction with an alkali metal sulfide in a polar organic solvent is disclosed in U.S. Pat. No. 3,354,129. Since then much work has been done to provide methods of modifying or controlling the melt flow rate of poly(arylene sulfide) thus produced. For example, the use of curing or chain extension reactions in post polymerization processes are known for decreasing the melt flow rate. In addition, the use of alkali metal carboxylates and/or polyhalo-substituted aromatic compounds having 3 or more halogen atoms per molecule in the polymerization reaction mixture also is known to reduce melt flow rate. In these illustrations noted above it is generally considered that a melt flow rate is inversely related to molecular weight. Extrusion rate, which is more specifically defined hereinafter, is a specific type of melt flow rate particularly useful for characterizing arylene sulfide polymers in the lower molecular weight range.

However, there is a need for poly(p-phenylene sulfide) of high extrusion rate in such fields as electronic encapsulation. Methods for reproducibly producing such high extrusion rate polymers are at present unsatisfactory for various reasons such as increased cost of added reactant materials, need for recycling excess reactants or risking completely off-spec polymer by slight mistakes in charging reaction ingredients.

It is therefore an object of this invention to provide a method for producing poly(p-phenylene sulfide) having a high extrusion rate in a readily controllable manner. It is another object of this invention to provide a method for producing poly(p-phenylene sulfide) having a high extrusion rate by adjustment of a reactant ratio in the reaction mixture. It is another object of this invention to provide a method for producing poly(p-phenylene sulfide) having an extrusion rate of about 100 to about 1,000 g/10 min.

STATEMENT OF THE INVENTION

In accordance with this invention a method is provided for producing a poly(p-phenylene sulfide) (PPS) having a high extrusion rate by admixing a p-dihalobenzene with a dehydrated admixture of an alkali metal hydroxide and an alkali metal bisulfide in a polar organic solvent and subjecting the resulting mixture to polymerization conditions to form a poly (p-phenylene sulfide) wherein the molar ratio of alkali metal hydroxide to alkali metal bisulfide is from about 0.80:1 to 0.98:1 in the dehydrated admixture of these materials. It has been found that employment of this alkali metal hydroxide/alkali metal bisulfide molar ratio readily and reproducibly provides a high extrusion rate poly(p-phenylene sulfide) which can be easily recovered and is well suited for use in applications such as encapsulation of electronic components.

As used throughout the specification and claims the term extrusion rate refers to a flow rate measurement on molten polymer based on ASTM D1238, Procedure B—Automatically Timed Flow Rate Measurement, made at 600° F., using a total driving mass of 345 g and an orifice having the dimensions of 0.0825±0.0002 inch diameter and 1.250±0.002 inch length.

The polar organic solvents useful in the present invention include amides including lactams, and sulfones. Specific examples of such polar organic solvents include hexamethylphosphoramide, tetramethylurea, N,N'-dimethylethyleneurea, N,N'-ethylenedipyrrolidone, N-methyl-2-pyrrolidone (NMP), pyrrolidone, caprolactam, N-ethylcaprolactam, sulfolane, N,N'-dimethylacetamide, low molecular weight polyamides, and the like. Organic amides are a presently preferred class of polar organic solvents and N-methyl-2-pyrrolidone (NMP) is a preferred member of said class.

p-Dihalobenzenes which can be employed in the process of this invention can be represented by the formula

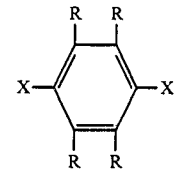

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Alkali metal bisulfides which can be employed in the process of this invention include lithium bisulfide, sodium bisulfide, potassium bisulfide, rubidium bisulfide, cesium bisulfide, and mixtures thereof. The alkali metal bisulfide usually is employed in hydrated form and/or as an aqueous mixture, preferably in the liquid state at the temperature of use. Although the water present with the alkali metal bisulfide can vary over a considerable range, generally the water will be present, as water of hydration and/or as free water, in an amount within the range of about 20 to about 60 weight percent, preferably about 25 to about 40 weight percent, based on the total weight of alkali metal bisulfide plus water associated therewith.

Alkali metal hydroxides which can be employed in the process of this invention include lithium hydroxide, sodium hydroxide, potassium hydroxide, rubidium hydroxide, cesium hydroxide, and mixtures thereof. Although the alkali metal hydroxide can be employed in anhydrous form, preferably it is employed in hydrated form and/or as an aqueous mixture, more preferably in the liquid state at the temperature of use. Although the water present with the alkali metal hydroxide can vary over a considerably range, generally the water will be present, as water of hydration and/or as free water, in an amount up to about 70 weight percent, preferably about 25 to about 60 weight percent, based on the total weight of alkali metal hydroxide plus water associated therewith.

In the production of p-phenylene sulfide polymers by the process of this invention, a mixture of alkali metal hydroxide and alkali metal bisulfide is usually added to the polar organic solvent, e.g. NMP. Then, substantially all of the water is removed by a distillation procedure to provide a dehydrated composition derived from alkali metal hydroxide, alkali metal bisulfide and polar organic solvent. Since small losses of sulfur species occur during the dehydration it is desirable to analyze the dehydrated composition by titration of a sample thereof with standardized 1N NCl in aqueous media. This titration will show a first end point that reflects the alkali hydroxide content and a second end point which reflects the alkali metal bisulfide content. The molar ratio of alkali metal hydroxide to alkali metal bisulfide can be determined directly by the following relation: mL titrant to first end point ÷ (mL titrant to second end point—mL titrant to first end point). It has been found that by employing a molar ratio of alkali metal hydroxide to alkali metal bisulfide in the dehydrated composition of about 0.80:1 to 0.98:1, preferably about 0.85:1 to 0.98:1 that high extrusion rate poly(p-phenylene sulfide) is readily obtained.

At least one p-dihalobenzene, with or without additional polar organic solvent, is then admixed with the dehydrated composition described above and subjected to polymerization conditions. Although the molar ratio of p-dihalobenzene to alkali metal bisulfide can vary over a considerable range, generally it will be within the range of about 0.9:1 to about 1.2:1, preferably about 1:1 to about 1.1:1.

The amount of polar organic solvent employed in the polymerization reaction mixture can vary considerably. Generally, the molar ratio of polar organic solvent to alkali metal bisulfide will be within the range of about 1:1 to about 10:1, preferably within the range of about 2:1 to about 5:1.

Although the reaction temperature at which the polymerization is conducted can vary over a wide range, generally it will be within the range of about 150° C. to about 400° C., preferably about 200° C. to about 300° C. The reaction time can vary widely, depending in part on the reaction temperature, but generally will be within the range of about 10 minutes to about 72 hours, preferably about 1 hour to about 8 hours. The pressure should be sufficient to maintain the p-dihalobenzene, and the polar organic solvent substantially in the liquid phase.

Although various known methods can be employed for the recovery of the high extrusion rate poly(p-phenylene sulfide) made according to the process of this invention, it is preferred to employ a method wherein the heated reaction mixture is subjected to a pressure reduction to atmospheric pressure which will cause a substantially complete flashing of the polar organic solvent from the reaction mixture. The flashed reaction mixture residue can be slurried with a liquid diluent such as water in which alkali metal halides and other impurities are soluble. The liquid diluent is removed with dissolved impurities such as by filtration leaving a particulate poly(p-phenylene sulfide). This washing process can be repeated until the desired level of poly(p-phenylene sulfide) purity is attained. Another known method that can be employed is the "water quench" process wherein the polymerization reaction mixture is contacted at a temperature above that at which PPS is in a molten state with a sufficient amount of a separation agent that is soluble in the polar organic solvent and is a non solvent for the PPS, e.g. water, to cause a phase separation of the molten PPS from the polar organic solvent. Subsequent cooling of the quenched, phase-separated mixture produces a slurry of particulate PPS in the polar organic liquid which can be filtered to recover the particulate PPS. The separated PPS can be washed as described above.

EXAMPLES

Examples are provided in an effort to assist one skilled in the art to a further understanding of the invention, and yet not be unduly limitative of the reasonable scope of the invention. The particular reactants, conditions, ratios, and the like, are all intended to be illustrative of our invention, and not limitative of the reasonable and suitable scope thereof.

EXAMPLE I

A series of polymerization runs was carried out in a 90 gallon stirred (400 rpm) reactor for the preparation of PPS. The reactant recipe for these runs is presented below.

| | Compound, lb mole |
|---|---|
| N—Methyl-2-pyrrolidone | 2.7944 |
| Sodium hydroxide (NaOH)[a] | Variable |
| Sodium bisulfide (NaSH)[b] | 0.9246 |
| p-Dichlorobenzene (DCB) | 0.9435 |

[a]Charged as an aqueous solution of 50.52 wt. % NaOH.
[b]Charged as an aqueous solution of 59.168 wt. % NaSH and 0.225 wt. % Na2S.

In each run the aqueous NaOH and aqueous NaSH were premixed in a separate vessel then the warmed liquid (about 115° C.) mixture charged with a following NMP flush to the reactor containing the remaining NMP. This mixture was then subjected to a dehydration step wherein water plus some NMP was removed from the reactor by distillation at a reflux ratio of 1/1. Takeoff overhead started at a reactor temperature of 166° C. and ended at 230°-232° C. over a period of 80-84 minutes. The amount distilled off was 67-70 lbs.

Molten DCB was then charged to the reactor at 225°-233° C. and the reaction mixture held at 232°-234° C. for one hour then at 275° C. for 1.5 hours. The reactor was vented with recovery of volatiles over about one hour to 55 psig, repressured to 150 psig with nitrogen, heated to 282° C. then the reactor contents transferred to another vessel wherein reduced pressure conditions caused the remaining NMP and other volatiles to be flashed overhead for recovery.

The reaction mixture comprising PPS was washed once with ambient tap water, rinsed with hot (82° C.) water, washed once with deaerated water at 176° C. with hot water rinse and given a final wash with deaerated water at 176° C. with ambient temperature deionized water rinse. The washing steps utilized a PPS slurry mixing tank then a nylong fabric moving belt filter system to separate the PPS from the wash/rince liquid. The washed PPS obtained from each run was dried and a sample tested for extrusion rate according to the method described above. The results obtained are presented in TABLE I below.

TABLE I

| Run No. | NaOH Charge lb mole | Molar Ratio[a] NaOH:NaSH | Extrusion Rate g/10 min |
|---|---|---|---|
| 1[b] | 0.9081 | 1.04:1 | 32 |
| 2[b] | 0.9081 | 1.04:1 | 49 |
| 3[c] | 0.8456 | 0.97:1 | 100 |
| 4[c] | 0.8475 | 0.97:1 | 92 |

[a]Determined by titration of a sample of the dehydrated mixture of NaOH/NaSH with 1N HCl in aqueous medium as described above.
[b]Control run.
[c]Invention run.

The results in TABLE I comparing Runs 3 and 4 with Runs 1 and 2 show that the lower molar ratio of NaOH:NaSH, i.e. 0.97:1 vs. 1.04:1, produced a PPS having a much higher extrusion rate.

EXAMPLE II

Two polymerization runs for the preparation of PPS were conducted in a two-gallon autoclave reactor equipped with temperature and pressure measuring means, stirring means, external heating means and internal cooling means. The reaction mixture recipe employed in these runs is shown below.

| | Compound, g (g mole) |
|---|---|
| N—Methyl-2-pyrrolidone (NMP) | 1,643 (16.6) |
| Sodium bisulfide [a](NaSH) | 336.4 (6.00) |
| Sodium hydroxide pellets (NaOH) | Variable |
| p-Dichlorobenzene (DCB) | 904.1 (6.15) |

[a]Charged as an aqueous solution of 58.42 wt. % NaSH.

The reactor was initially charged with the NaSH, NaOH pellets and NMP. The reactor was purged with nitrogen while stirring at 250 rpm and heated to 160° C. to initiate a dehydration by distilling off water plus some NMP. In Run 5 330 mL was collected as the reactor temperature reached 180° C. In Run 6 390 mL was collected as the reactor temperature reached about 200° C.

The DCB was next charged with an additional 325 mL of NMP. The reaction mixture was heated to 265° C. and held for one hour, heated to 265° C. and held for one hour and then heated to 280° C. and held for one hour. Reactor pressure was 280 psig at the end of the reaction sequence. Pressure was reduced to 65 psig by venting for 50 minutes while holding the temperature at 280° C. The reaction mixture was then allowed to cool overnight.

Each reaction mixture was washed with water then with acetone and the PPS dried in a forced air oven to recover 608.6 grams in Run 5 and 601 grams in Run 6. Samples of dried PPS from each run were then tested for extrusion rate results by the method as described above. The results obtained in these runs are shown below in TABLE II.

TABLE II

| Run No. | NaOH Charge g mole | Molar Ratio[a] NaOH:NaSH | Extrusion Rate g/10 min |
|---|---|---|---|
| 5[b] | 6.05 | 1.04:1 | 70 |
| 6[c] | 5.57 | 0.96:1 | 231 |

[a]See footnote [a] TABLE 1.
[b]Control run.
[c]Invention run.

The results in TABLE II comparing Run 6 with Run 5 again show that the lower molar ratio of NaOH/NaSH produced a PPS having a much higher extrusion rate.

That which is claimed is:

1. In a method for the preparation of poly(p-phenylene sulfide) wherein at least one p-dihalobenzene is brought together with a dehydrated admixture of at least one alkali metal hydroxide and at least one alkali metal bisulfide in the presence of at least one polar organic solvent under polymerization conditions for a time sufficient to form a reaction mixture comprising said poly(p-phenylene sulfide); the improvement comprises employing a molar ratio of alkali metal hydroxide to alkali metal bisulfide in said dehydrated admixture of about 0.80:1 to 0.98:1.

2. A method of claim 1 wherein said alkali metal hydroxide is sodium hydroxide and said alkali metal bisulfide is sodium bisulfide.

3. A method of claim 2 wherein said p-dihalobenzene is p-dichlorobenzene.

4. A method of claim 2 further comprising recovering said poly(p-phenylene sulfide) from said reaction mixture by steps comprising:
   (a) removing polar organic solvent and any water present from said reaction mixture after the polymerization is substantially complete,
   (b) washing said reaction mixture from step (a) with water to extract alkali metal halide, and
   (c) filtering said poly(p-phenylene sulfide) from said washed reaction mixture from step (b),
   thereby recovering said poly(p-phenylene sulfide).

5. A method of claim 1 wherein said poly(p-phenylene sulfide) is recovered from said reaction mixture by steps comprising:
   (a) contacting said reaction mixture at a temperature above that at which poly(p-phenylene sulfide) is in molten phase with a sufficient amount of a separation agent that is soluble in said polar organic solvent and is a non solvent for poly(p-phenylene sulfide) to cause a phase separation of said molten poly(p-phenylene sulfide) from said polar organic solvent,
   (b) reducing the temperature of said reaction mixture from step (a) sufficiently to produce a slurry comprising particulate poly(p-phenylene sulfide) in said polar organic solvent,
   (c) filtering said slurry produced in step (b) to recover particulate poly(p-phenylene sulfide) therefrom, and
   (d) washing said recovered poly(p-phenylene sulfide) to remove impurities thereby.

6. A method according to claim 5 wherein said separation agent is water.

7. A method for the production of poly(p-phenylene sulfide) having an extrusion rate of about 100 g/10 min. to about 1000 g/10 min. comprising:

admixing at least one p-dihalobenzene with a dehydrated admixture of alkali metal hydroxide and alkali metal bisulfide in the presence of an organic amide under polymerization conditions, wherein the molar ratio of said alkali metal hydroxide to said alkali metal bisulfide in said dehydrated admixture is in the range of about 0.80:1 to 0.98:1; wherein the molar ratio of p-dihalobenzene to alkali metal bisulfide is in the range of about 1:1 to about 1.1:1; thereby preparing said poly(p-phenylene sulfide), and recovering said poly(p-phenylene sulfide) from the polymerization reaction mixture.

8. A method of claim 7 wherein said alkali metal hydroxide is sodium hydroxide and said alkali metal bisulfide is sodium bisulfide.

9. A method of claim 8 wherein said organic amide is N-methyl-2-pyrrolidone.

10. A method of claim 9 wherein said p-dihalobenzene is p-dichlorobenzene.

* * * * *

UNITED STATES PATENT AND TRADEMARK OFFICE
CERTIFICATE OF CORRECTION

PATENT NO. : 4,786,711
DATED : 11/22/88
INVENTOR(S) : Guy Senatore et al

It is certified that error appears in the above-identified patent and that said Letters Patent is hereby corrected as shown below:

In column 6, claim 4, line 33 "2" should be ---1---.

Signed and Sealed this

Fourth Day of April, 1989

Attest:

DONALD J. QUIGG

*Attesting Officer*         *Commissioner of Patents and Trademarks*